US010854985B2

(12) United States Patent
Achour et al.

(10) Patent No.: US 10,854,985 B2
(45) Date of Patent: Dec. 1, 2020

(54) SMART INFRASTRUCTURE SENSING AND COMMUNICATION SYSTEM

(71) Applicant: Metawave Corporation, Palo Alto, CA (US)

(72) Inventors: Maha Achour, Palo Alto, CA (US); Yan Wang, Palo Alto, CA (US); Chiara Pelletti, Palo Alto, CA (US); Bernard Casse, Palo Alto, CA (US)

(*) Notice: Subject to any disclaimer, the term of this patent is extended or adjusted under 35 U.S.C. 154(b) by 116 days.

(21) Appl. No.: 16/115,521

(22) Filed: Aug. 28, 2018

(65) Prior Publication Data

US 2019/0067826 A1 Feb. 28, 2019

Related U.S. Application Data

(60) Provisional application No. 62/551,761, filed on Aug. 29, 2017.

(51) Int. Cl.
| | | |
|---|---|---|
| *H01Q 15/00* | (2006.01) | |
| *H01Q 21/06* | (2006.01) | |
| *H01Q 3/46* | (2006.01) | |
| *H04W 4/38* | (2018.01) | |

(52) U.S. Cl.
CPC .......... *H01Q 15/0026* (2013.01); *H01Q 3/46* (2013.01); *H01Q 15/00* (2013.01); *H01Q 15/0086* (2013.01); *H01Q 21/06* (2013.01); *H01Q 21/065* (2013.01); *H04W 4/38* (2018.02)

(58) Field of Classification Search
CPC .. H01Q 15/0026; H01Q 3/46; H01Q 15/0086; H01Q 21/065; H01Q 15/00; H01Q 21/06; H04W 4/38
USPC .......................................................... 343/909
See application file for complete search history.

(56) References Cited

U.S. PATENT DOCUMENTS

| | | | | |
|---|---|---|---|---|
| 10,374,710 | B2* | 8/2019 | Ashrafi | H04B 10/11 |
| 2006/0261950 | A1* | 11/2006 | Arneson | G06K 19/0723 340/572.1 |
| 2010/0086750 | A1* | 4/2010 | Blumberg | B32B 27/00 428/195.1 |
| 2014/0085693 | A1* | 3/2014 | Mosallaei | G02B 1/002 359/107 |
| 2016/0013531 | A1* | 1/2016 | Casse | H01P 1/184 333/161 |

* cited by examiner

*Primary Examiner* — Hai V Tran
(74) *Attorney, Agent, or Firm* — Sandra Lynn Godsey (57) ABSTRACT

Examples disclosed herein relate to a smart infrastructure sensing and communication system. The system includes a resonant structure formed of an array of resonant cells and attached to a glass of a smart infrastructure. The resonant structure generates a radio frequency ("RF") signal that is shaped and steered by the array. A controller is in communication with the resonant structure to receive the RF signal.

20 Claims, 8 Drawing Sheets

SMART INFRASTRUCTURE SENSING AND COMMUNICATION SYSTEM

CROSS-REFERENCE TO RELATED APPLICATIONS

This application claims priority to U.S. Provisional Application No. 62/551,761, filed on Aug. 29, 2017, and incorporated herein by reference.

BACKGROUND

Globally, there is a need for higher energy efficiency, enhanced wireless communications, and new ways to utilize and optimize existing infrastructures to achieve these goals. One example is in smart buildings, where new technologies have emerged to reduce energy use, maintain a more comfortable work and living environment, and enable better communication among building dwellers. Other examples include smart vehicles, smart roads, smart traffic signals, and other smart infrastructures.

A key to achieving these goals is better wireless connectivity between smart infrastructures and the outside world. The emerging 5G standard is expected to address the growing demands for greater speed, more data, more devices, and lower latency. However, as the 5G standard operates in the millimeter wave spectrum, wireless signals have a short range (just over a kilometer) and become more susceptible to propagation loss, high atmospheric attenuation and other environmental degradation. These and other challenges impose more ambitious goals on smart infrastructure design.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

A smart infrastructure sensing and communication system is disclosed. The system is suitable for many different applications and can be deployed in a variety of different environments and configurations. In various examples, the system can be deployed in smart infrastructures such as smart buildings, vehicles, street signs, lamp posts and so on. The system can utilize the infrastructure materials and structural configuration of a variety of infrastructure types to enhance their internal environment. In some examples, the system is attached to a glass window or other such interface of the smart infrastructure to enable enhanced communications, where the system acts as a relay to enable high frequency signals to pass through the glass or other such interface to users, devices or other smart infrastructures. This becomes more and more and important with the dependency on and use of cellular and other wireless communications and signaling.

It is appreciated that, in the following description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

Figure 1:
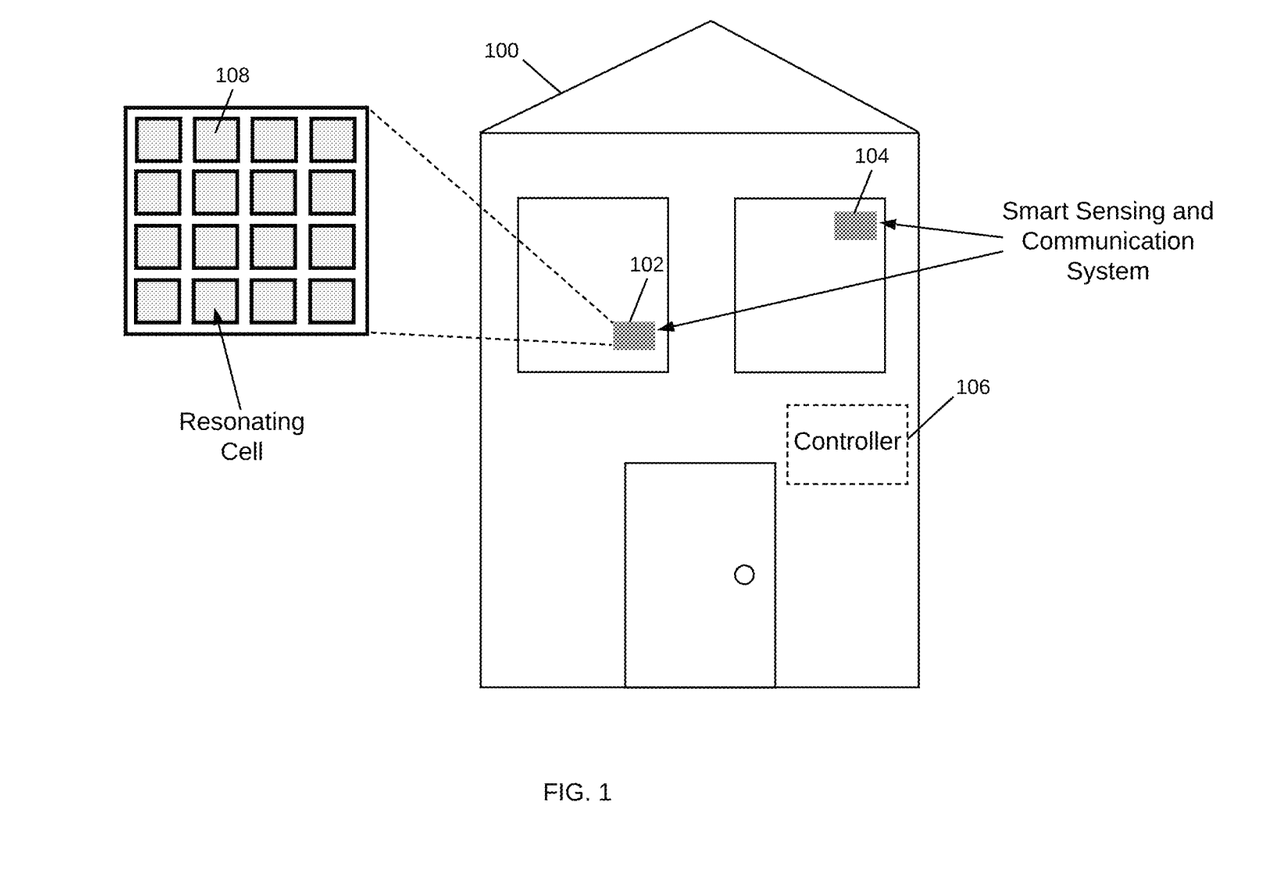
FIG. 1 is a schematic diagram of a smart infrastructure sensing and communication system for use in a smart building in accordance with various examples.

Referring now to FIG. 1, a schematic diagram of a smart infrastructure sensing and communication system for use in a smart building in accordance with various examples is described. Smart building 100 is an infrastructure with building, technology, and energy systems to control and enhance the operations of building 100 and its internal environment. As illustrated, smart building 100 has two smart infrastructure sensing and communications systems 102-104 attached to two of its glass windows. Systems 102-104 are in communication with a controller 106 to control and take actions that enhance building 100's internal environment. Controller 106 may include artificial intelligence modules to learn from communications received from systems 102-104, take actions, and also control systems 102-104 in a variety of scenarios. In this way, systems 102-104 are suitable for a range of applications such as radar for autonomous vehicles, wireless base station transmissions, smart glass controls, health and medical sensing and response implementations, safety and environmental sensing and monitoring, building structure sensing, and so forth. The smart controller 106 is able to adapt to each of these scenarios.

In some examples, systems 102-104 provide ways to determine the internal use of a room, office, space and so forth, within building 100, so as to adjust the energy consumption therein. In this way, when a room is not in use there may be less need to light the room; on detection of a space that is not in use, systems 102-104 send a message to controller 106 to adjust thermostat, air conditioning, window treatments and so forth. In other examples, systems 102-104 enable monitoring of the frame and structure of the building 100 to identify potential safety issues and provide warning signals and messages to controller 106 that enable correction. This may identify conditions that would cause a loss of integrity and potential failure in building 100.

As illustrated, systems 102-104 are formed, placed, configured, embedded, or otherwise connected to a portion of building 100, such as its glass windows. The location of systems 102-104 may be in the upper or lower part of the windows away from users' or building dwellers' field of view. Systems 102-104 are resonant structures or reflect arrays having an array of resonant elements or cells 108. Each resonant element may include a single or multi-layer patch, loop or metamaterial. A metamaterial is an artificially structured element used to control and manipulate physical phenomena, such as the electromagnetic ("EM") properties of a signal including its amplitude, phase, and wavelength.

Metamaterial structures behave as derived from inherent properties of their constituent materials, as well as from the geometrical arrangement of these materials with size and spacing that are much smaller relative to the scale of spatial variation of typical applications. A metamaterial is not a tangible new material, but rather is a geometric design of known materials, such as conductors, that behave in a specific way. A metamaterial cell may be composed of multiple microstrips, gaps, patches, vias, and so forth having a behavior that is the equivalent to a reactance element, such as a combination of series capacitors and shunt inductors. Various configurations, shapes, designs and dimensions may be used to implement specific designs and meet specific constraints. In some examples, a metamaterial cell having a number of edges and discontinuities may model a specific-type of electrical circuit and behave in a similar manner. In this way, a metamaterial cell radiates according to its configuration. Changes to the reactance parameters of the metamaterial cell result in changes to its radiation pattern. Where the radiation pattern is changed to achieve a phase change or phase shift, the resultant structure is a powerful antenna, as small changes to the metamaterial cell can result in large changes to a resulting beamform.

A metamaterial cell may include a variety of conductive structures and patterns, such that a received transmission signal is radiated therefrom. In various examples, each metamaterial cell 108 may have some unique properties. These properties may include a negative permittivity and permeability resulting in a negative refractive index; these structures are commonly referred to as left-handed materials ("LHM"). The use of LHM enables behavior not achieved in classical structures and materials, including interesting effects that may be observed in the propagation of electromagnetic waves, or transmission signals. Metamaterials can be used for several interesting devices in microwave and terahertz engineering such as antennas, sensors, matching networks, and reflectors, such as in telecommunications, automotive and vehicular, robotic, biomedical, satellite and other applications. For antennas, metamaterials may be built at scales much smaller than the wavelengths of transmission signals radiated by the metamaterial. Metamaterial properties come from the engineered and designed structures rather than from the base material forming the structures. Precise shape, dimensions, geometry, size, orientation, arrangement and so forth result in the smart properties capable of manipulating EM waves by blocking, absorbing, enhancing, or bending waves. In various examples, control of beam form and direction in a metamaterial cell 108 may be achieved by a voltage controlled variable reactance device in each cell.

Systems 102-104 may be passive or active resonant structures. As passive structures, systems 102-104 act as relays reflecting radio frequency ("RF") signals from the outside world (whether from a wireless base station or another such system located in another smart infrastructure) to specific and predefined locations inside the building 100, such as to controller 106. The glass windows to where the systems 102-104 are attached may act as a filter to RF signals, and therefore, the addition of the systems 102-104 enables the RF signals received at the glass to be relayed to controller 106 and/or users in the building 100. In some examples, systems 102-104 provide a passive bandpass filter antenna on the glass windows and enable transmission of EM radiation blocked by the glass glazing's infrared coating. This overcomes some of the difficulties of high frequency wireless communications as cellular systems move to 5th generation.

As active structures, systems 102-104 include active resonant cells, such as a metamaterial cell with a voltage controlled varactor. The active cells also reflect RF signals from the outside world, but unlike passive cells, they are able to reflect RF signals to multiple directions as needed through beam forming and phase shifting. The varactors on active metamaterial cells enable phase shifting of the received RF signals to achieve the desired beam dimensions to transmit the received signal to controller 106 or a user or device proximate the systems 102-104. The systems 102-104 can collectively be used to further reduce the beam width and increase the field of view or communicate in a Non-Line-of-Sight way. Individually, each system can act as a sub-array controlling each beam separately. Note that the user need not be in a given position, such as close to the glass window to where systems 102-104 are attached, but may be anywhere within the room, space or building 100. The systems 102-104 are able to locate the user, and direct signals to the user. The systems 102-104 are also capable to transmit signals to any number of users, including the ability to multicast a same signal to multiple users.

This low-complexity, planar geometry has thin architecture, that may be printed on a surface, such as a PCB board, glass, paper or other material. This design eliminates the complex needs associated with digital beam forming, resulting in a low cost, low complexity, reduced power, small footprint, flexible use system. The active systems 102-104 incorporate novel metamaterial cells with varactors for phase shifting that replace traditional phase shifting circuitry, and also may be used in combination with these traditional circuits, so as to provide optimum systems while allowing legacy extension. This may be critical in applications where a system needs regulatory approval and the manufacturer wants time to incorporate new technologies slowly.

The systems 102-104 offer high resolution and high signal-to-noise ratio ("SNR"). Once the resonant elements and structures are designed, they may be simply constructed and manufactured to a variety of applications. In some applications, systems 102-104 are integrated into glass substrates, such as for use in building 100's windows. Systems 102-104 may also be used in car windows, house windows and other locations where communication enhancement is desired or where microwave signal transmission is desired. In some examples, the systems 102-104 are integrated into a glass substrate along with thin film transistors.

As illustrated, systems 102-104 may track occupancy, determine location, communicate signals to and from the user. Systems 102-104 may also be used in coordination with smart glass, such as electrochromic glass, that measures or predicts an internal room temperature. The systems 102-104 may receive an indication of internal room temperature and/or an indication to take action to adjust the internal room temperature or another aspect (e.g., lighting, alarm system, security system, etc.) of the smart building 100, and then send a signal to controller 106 in the room or to a cell phone or wireless device of a user, whereupon an adjustment is made. The systems 102-104 may also be used to transmit the adjustment information, such as a record of what action was taken, to controller 106 or another computational device (not shown) for logging the conditions and resultant action taken.

It is appreciated that the systems 102-104 can replace conventional phase shift applications. The active systems 102-104 incorporate novel metamaterial cells with varactors for phase shifting that replace traditional phase shifting circuitry, and also may be used in combination with these traditional circuits, so as to provide optimum systems while allowing legacy extension. This may be critical in applications where a system needs regulatory approval and the manufacturer wants time to incorporate new technologies slowly. Systems 102-104 with active metamaterial cells are able to provide spatially varying phase shift distribution and control angular distribution of reflected power. The phases of the array elements are tuned so that the effective radiation pattern is reinforced in desired directions and suppressed in undesired directions.

In some examples, an all-electronic beam steering and scanning apparatus reduces the need for high computational processing that typically requires additional hardware. This hardware may be cumbersome and add to the weight, cost and design of a product. For example, in a commercial building there is ability to route information throughout the building with these systems 102-104 placed in various locations. The systems 102-104 can form a network that cascades a signal throughout a building. It is common for a given building to have areas of high cellular receptivity and areas of low-to-no receptivity. This may be overcome by transmitting the cellular, or other wireless signal, from window to window, or window to wall, or window to door, and so forth. Systems 102-104 allow the entire building 100 to benefit from the strongest signal available. Smart controls (e.g., in controller 106) identify the strongest signal and implement an efficient, effective cascade scenario. This also may provide double paths, allowing the accumulated signal received to be greater than that cascaded through a single path.

This cascading may be enhanced in some examples, where the systems 102-104 and/or at least a portion of the electronic circuit that controls the systems 102-104 may be made of a transparent conductor, such as Indium Tin Oxide ("ITO"), enabling a relay from window to window, or otherwise as described herein. The ability for a building 100 to provide RF signals to parts of the building where cell coverage/reception is limited is critical to business at all cellular frequencies. Some examples incorporate these into the windows of vehicles to enable vehicle to vehicle communication, as well as communication to smart roads, smart buildings, smart traffic signals and signs, and so forth. Systems 102-104 make a universal network possible by incorporating existing structures and known devices. They also enable quick updates without modification or replacement of hardware, as active metamaterial cells may be controlled by software, which may be remotely upgraded, updated, modified and so forth.

The specific cascade path, or the number of steps involved, may be transmitted back to the transmitting source, such as a base station, to communicate to the base station the need for more focused, or less focused, transmission beams to the building 100. The systems 102-104 may be embedded, or built into, a window, for example. Such a configuration may construct resonant structures in systems 102-104 using a transparent conductive material, such as ITO. The circuit does not interfere with the visibility and transparency of the window, and also may be designed to change transparency characteristic to match that of the window, such as for an electrochromic window. In this way, when the window becomes opaque, the circuit also becomes opaque.

In window applications, external and/or internal coatings on the substrate intended to block sunlight from entering a room may also act to block electromagnetic ("EM") radiation, such as cellular signals. In some examples, a band pass filter may be incorporated into the glass substrate to allow desired EM radiation frequencies to pass through the window. In some examples, such structures are patterned or etched onto the substrate, such as glass. Such a passive device using a resonant structure allows communications to get into the building 100 as it acts a relay. Some examples incorporate a system for occupancy sensing in a building or space to count the number of people. This may be used to count people within a structure or outside a structure, such as in a park or during an event. The system in a building (e.g., system 102 or 104) may be connected to an energy management system, which enables heating, cooling and air filtering as a function of the location, number and density of the population in order to save energy in the building as well as to provide a comfortable environment. The ability to count the number of people in the building 100 is critical to firemen and police, when determining the occupancy of the building in an emergency. These examples act as a flight black box, maintaining a current record of the occupancy and density of the building 100.

The examples described above may be used with existing technologies as a sensing and transmission mechanism, such as to incorporate with micro Doppler sensors, EM radiation sensors, micro-motion sensors and so forth. In medical applications, the sensors may enable monitor of heart beat, breathing patterns, or other important metrics, providing an early warning system to the individual or the medical professional as to a deteriorating condition. In some examples, the system may monitor heart beats to detect an impending heart incident or heart attack. Monitoring breathing patterns may avoid an asthma attack, as well as to monitor a baby or child. In some examples, resonant structures are built into equipment, such as fire-fighting equipment, to quickly ascertain the number of people in a building that is on fire. This avoid the potential peril and loss of life, as well as enabling the professional to focus their efforts on the most important areas of the building 100.

Figure 2:
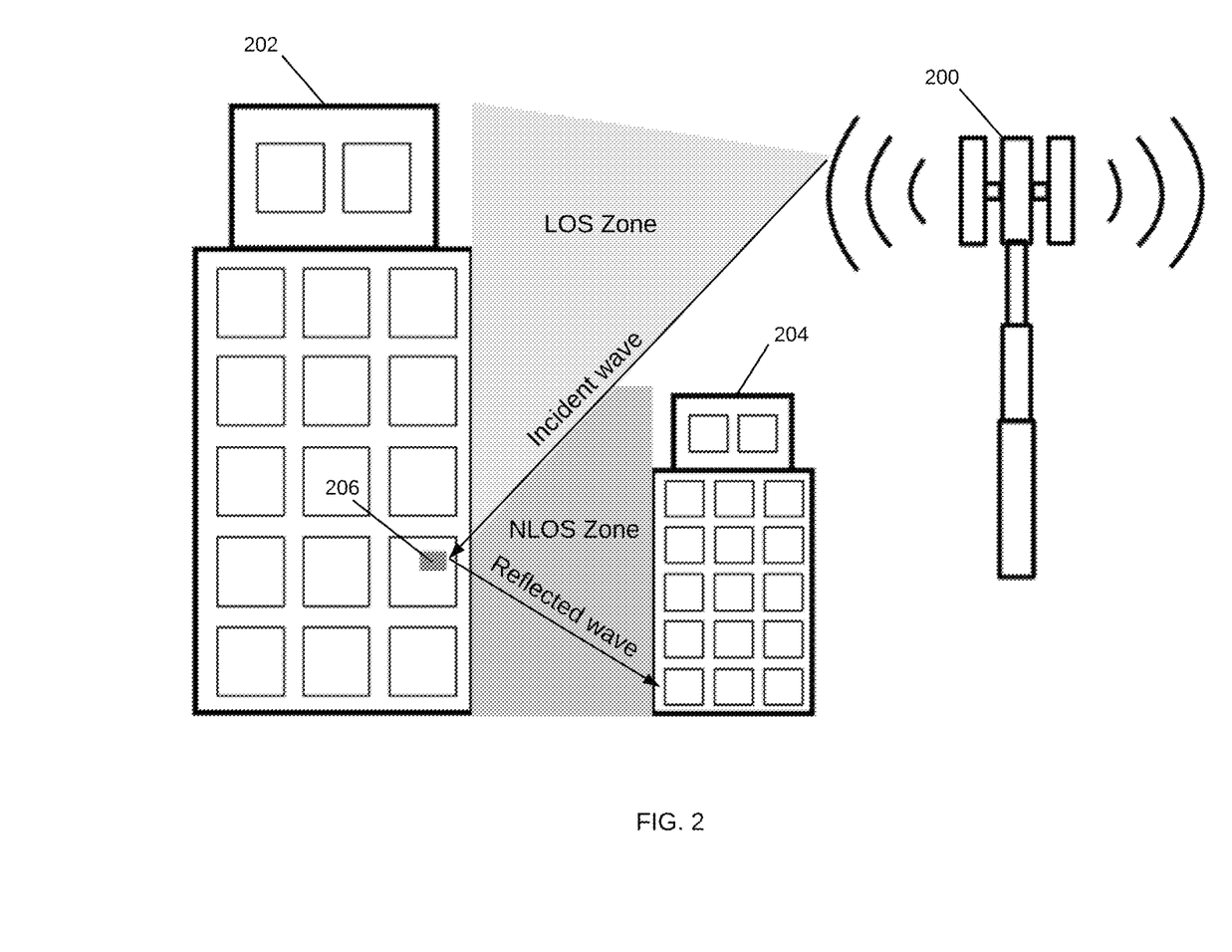
FIG. 2 is a schematic diagram illustrating an application for the smart infrastructure sensing and communication system of FIG. 1.

FIG. 2 shows an example application for the smart infrastructure sensing and communication system of FIG. 1. Wireless base station 200 transmits and receives wireless signals from mobile devices within its coverage area. The coverage area may be disrupted by buildings or other structures in the environment, thereby affecting the quality of the wireless signals. In the illustrated example, buildings 202 and 204 affect the coverage area of base station 200 such that it has a Line-of-Sight ("LOS") zone. Users of devices outside of this zone may have either no wireless access or significantly reduced coverage.

Wireless coverage can, however, be provided to users outside of the LOS zone by the installation of a sensing and communication system 206 on a glass window of building 202 as described above. System 206 with an array of resonant cells is able to act as a relay between base station 200 and users outside of its LOS zone. Users in a Non-Line-of-Sight ("NLOS") zone are able to receive wireless signals that are reflected off the system 206 from wireless signals transmitted by the base station 200. The system 206 can be either a passive or active resonant structure as described herein to effectively provide wireless coverage to NLOS or dead zones.

Figure 3:
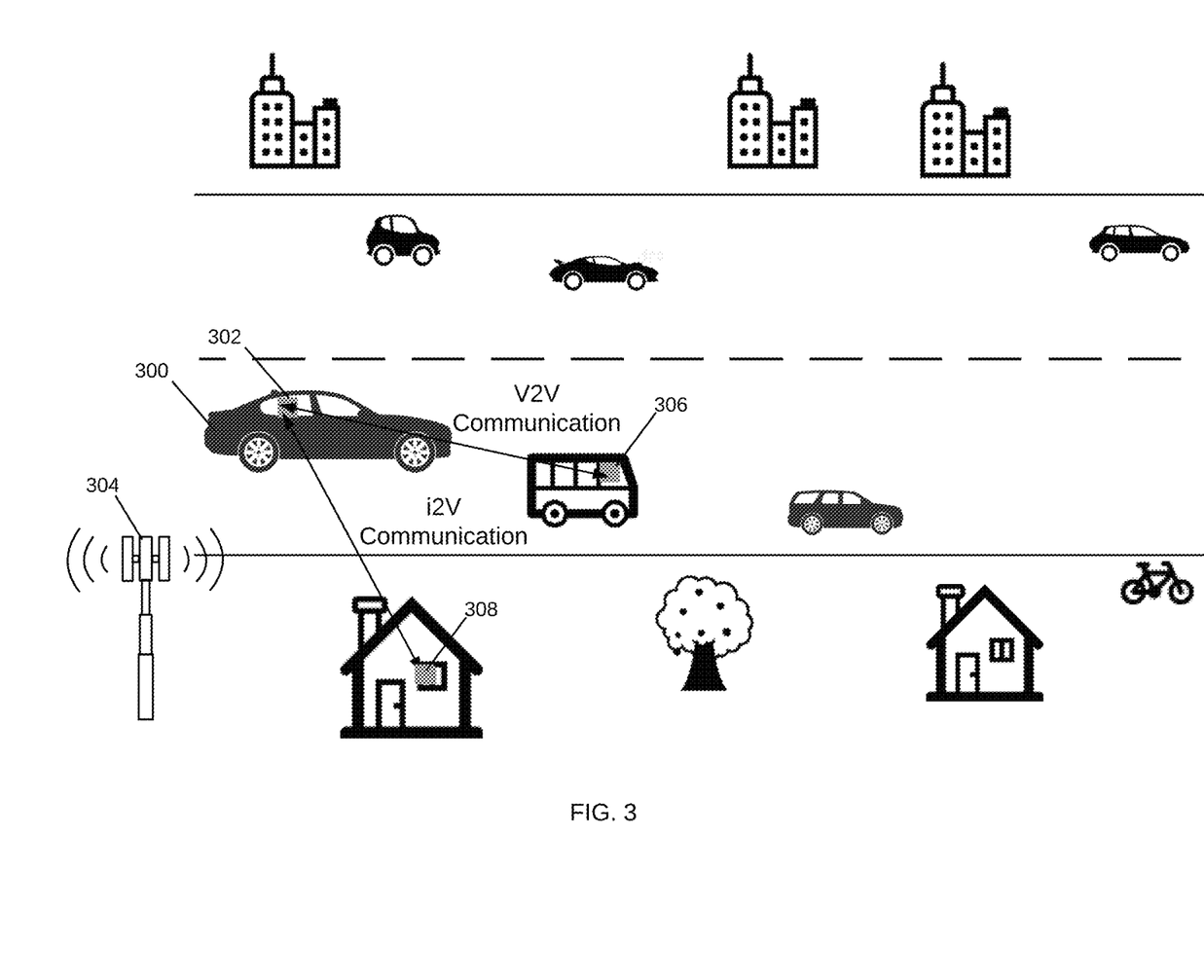
FIG. 3 shows another example application for the smart infrastructure sensing and communication system of FIG. 1.

Another example application for the smart infrastructure sensing and communication system of FIG. 1 is shown in FIG. 3. As illustrated, vehicle 300 has a sensing and communication system 302 attached to its window. The system 302 is able to receive wireless signals from base station 304, act as a relay to reflect them and provide vehicle-to-vehicle ("V2V") communications with other sensing and communication systems in its vicinity, such as system 306. The system 302 is also able to communicate with system 308 to provide infrastructure-to-vehicle ("I2V") communication capabilities. The systems 302, 306 and 308 may all be used in various road and environmental situations requiring the effective relay of communication messages, including to assist emergency response systems.

Figure 4:
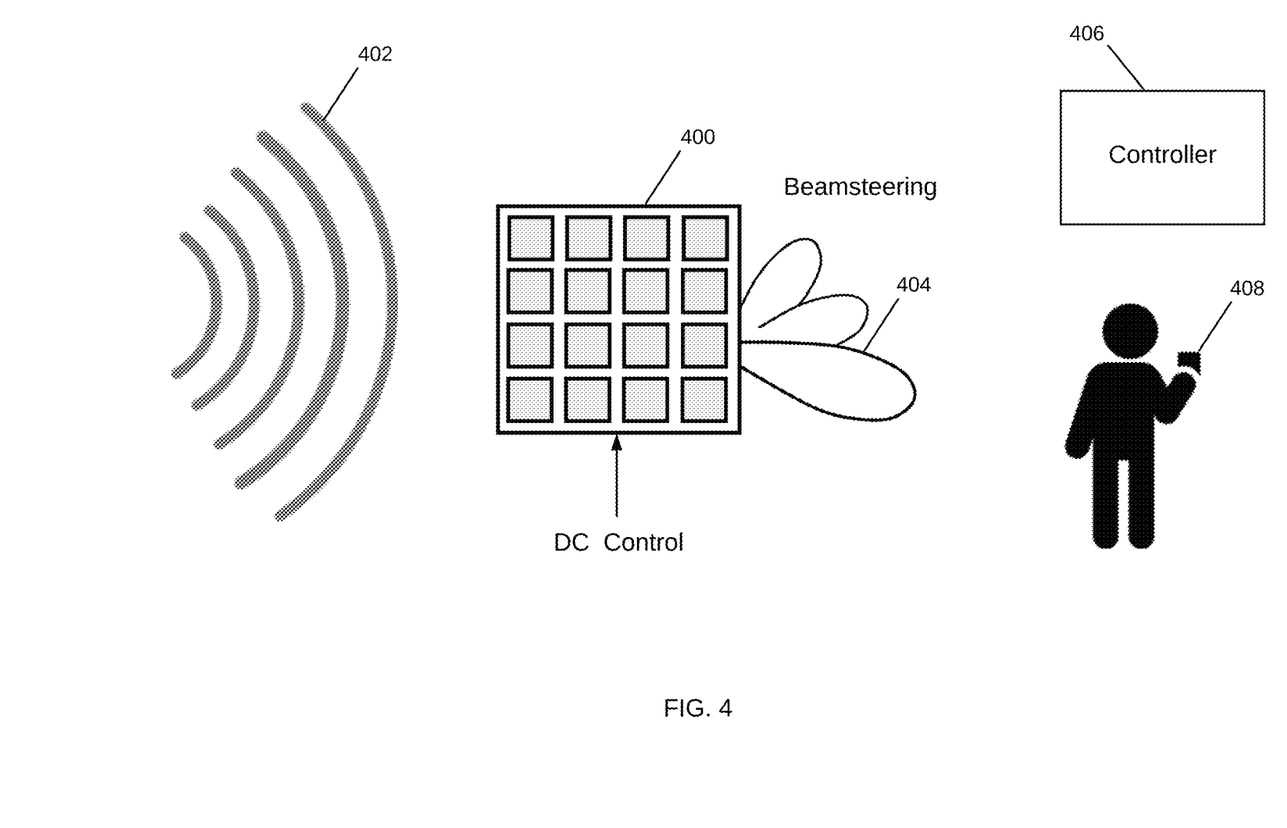
FIG. 4 is a schematic diagram illustrating a smart infrastructure sensing and communication system in accordance with various examples.

Attention is now directed to FIG. 4, which shows a schematic diagram illustrating a smart infrastructure sensing and communication system in accordance with various examples. Sensing and communication system 400 has an array of resonant cells for relaying RF signals, such as wireless signal 402 received from a base station. In various examples, system 400 may be either a passive or active relay for reflecting received RF signals into beamforms that are then transmitted to other such systems or wireless devices. In the case of active resonant cells, DC control may be provided to varactors in the cells for transmitting the reflected RF signals to multiple directions as needed through beam forming and phase shifting. The reflected RF signals may be sent to a controller 406 inside a smart infrastructure, smart vehicle and so on that includes the system 400 attached to its window. The reflected RF signals may also be sent to wireless devices in the vicinity of system 400, such as wireless device 408 of a user that may be inside the smart infrastructure.

Figure 5:
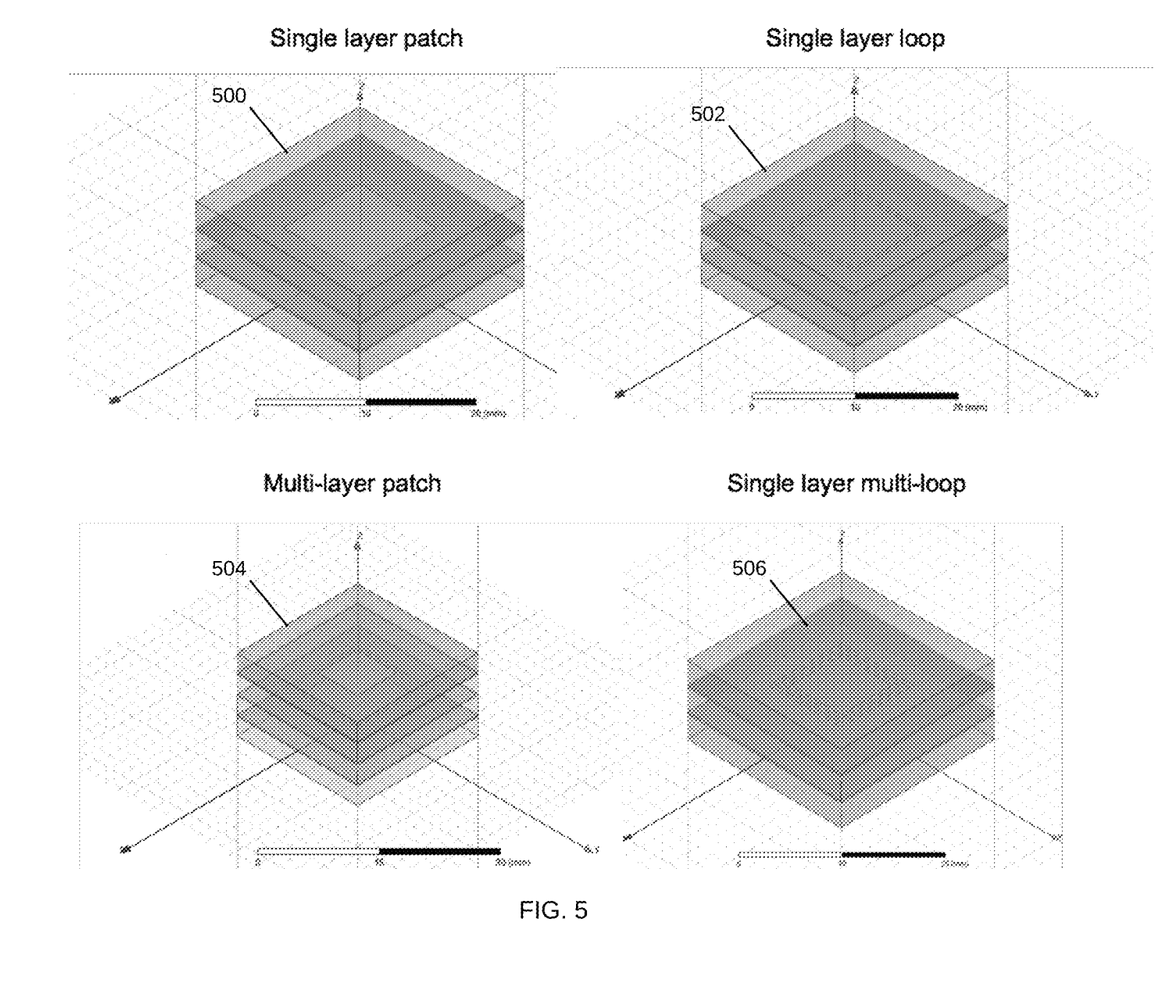
FIG. 5 illustrates different configurations of resonant cells for a passive sensing and communication system in accordance with various examples.

FIG. 5 illustrates different example configurations of resonant cells for a passive sensing and communication system. The passive sensing and communication system, e.g., system 102 or 104 of FIG. 1, includes an array of resonant cells to act as an RF signal relay and provide point-to-point wireless connectivity between two nodes. Resonant cell structures may include etched patterns on glass materials and can either be all metallic or formed of a combination of metal and dielectric patterned layers. The resonant cells can have either a single or multiple layer resonant patches or loops. As illustrated, resonant cell 500 has a single layer patch, resonant cell 502 has a single layer loop, resonant cell 504 has a multi-layer patch, and resonant cell 506 is a single layer, multi-loop resonant cell. Resonant cells 500-506 are sized to be a fraction (e.g., ½, ⅓ or ¼) of the RF signal wavelength.

Each resonant cell configuration has its characteristics and advantages. Resonant cell 500 with the single layer patch is light weight, easy to fabricate, and provides a very sharp resonant. However, cell 500 does not offer a full 360° phase range, limiting its application to a relay with RF transmission to specific directions and locations. Resonant cell 504 is a multi-resonator that can extend the phase range even beyond a full 360° and provide a flatter resonance, albeit at an increased fabrication complexity and/or weight. And resonant cells 502 and 506 have the advantage of providing a reflect array in which the metal loop(s) occupies very little surface area and offering high transparency in case the cells are fabricated with visible silver printing. The metal loop can provide sharper resonance and even a larger phase range as compared to a patch, at the expense of more reflection loss. Each cell has a ground plane, which can be replaced with a Frequency Selective Surface ("FSS") in various examples to allow for partial optical transparency. It is noted that increasing the thickness of the resonant cells' substrate reduces their reflection loss and decreases their phase range. It is also noted that decreasing the cell size reduces the reflection loss at the expense of a decreased phase range.

Figure 6:
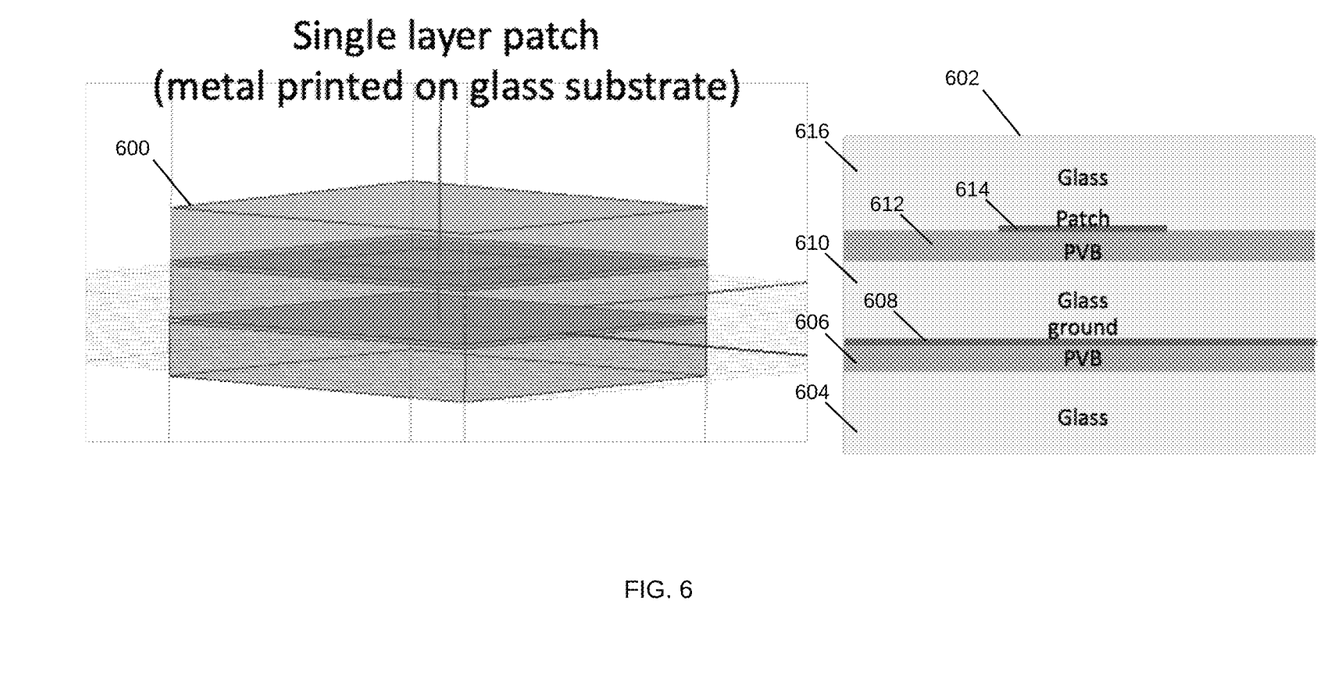
FIG. 6 illustrates a single layer patch resonant cell for use in a passive sensing and communication system in accordance with various examples.
Figure 7:
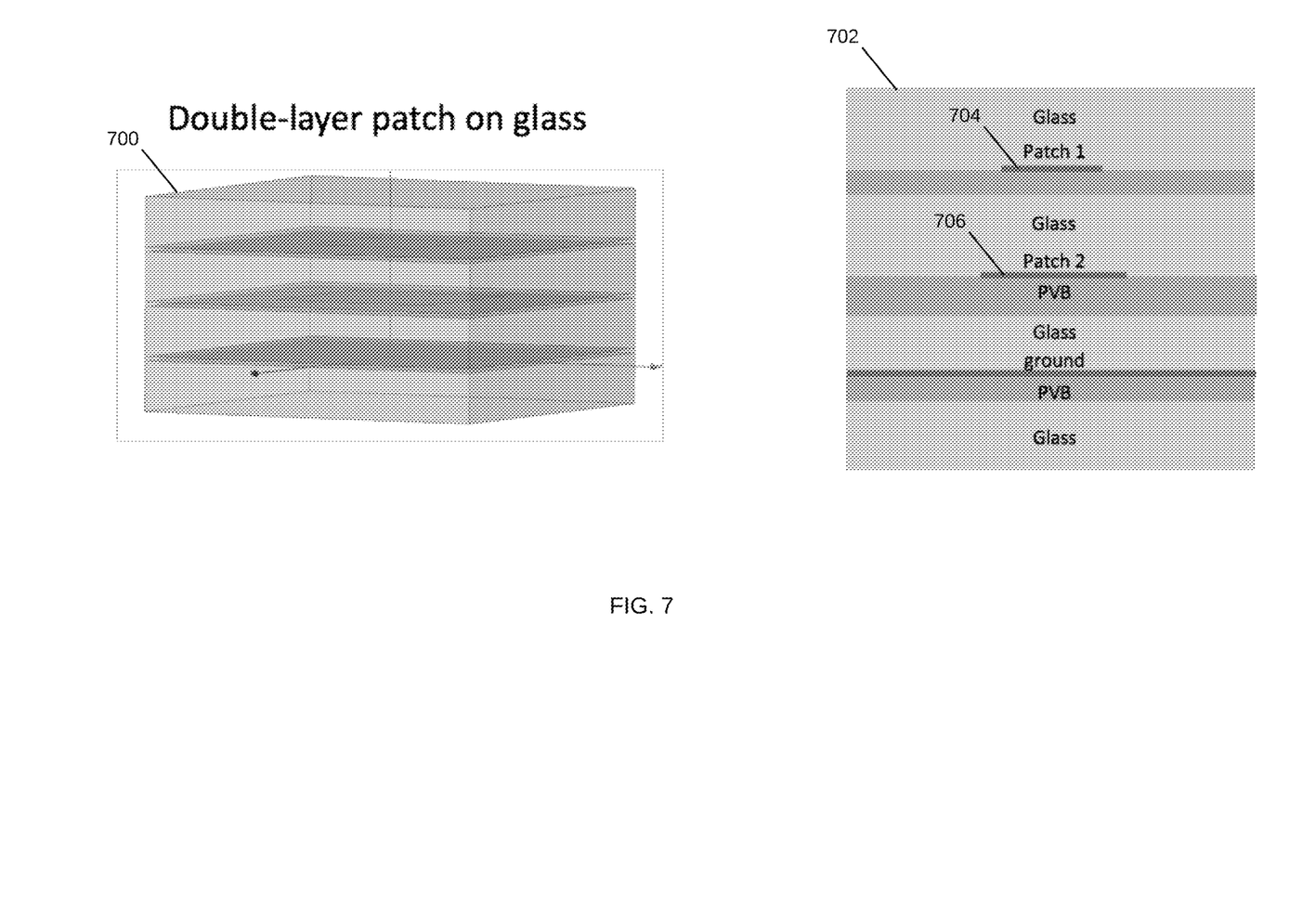
FIG. 7 illustrates a double layer patch resonant cell for use in a passive sensing and communication system in accordance with various examples.

FIG. 6 illustrates an example single layer patch resonant cell. Cell 600, similar to cell 500, is a single layer resonant patch formed of metal printed on a glass substrate for attachment to a glass window in a smart infrastructure or smart vehicle. Stack 602 illustrates the layers of materials in cell 600: a glass substrate 604 underneath a PVB layer 606 to act as a glue to bond the glass substrate 604 to a metal ground plane 608. The metal ground plane is followed by another glass substrate 610, a PVB layer 612, and the metal resonant patch 614. Lastly, a glass layer 616 is added on top. Similar to glass substrate 604, glass layer 616 prevents exposing the metal resonant patch 614 and the metal ground plane 608 to air, which leads to oxidation. FIG. 7 illustrates a double layer patch resonant cell 700 that is formed similarly to cell 600, except that it has two resonant patches. Stack 702 illustrates the layers of materials in cell 700, which constitute glass layers on the bottom and top to prevent oxidation of the double patches 704-706.

Figure 8:
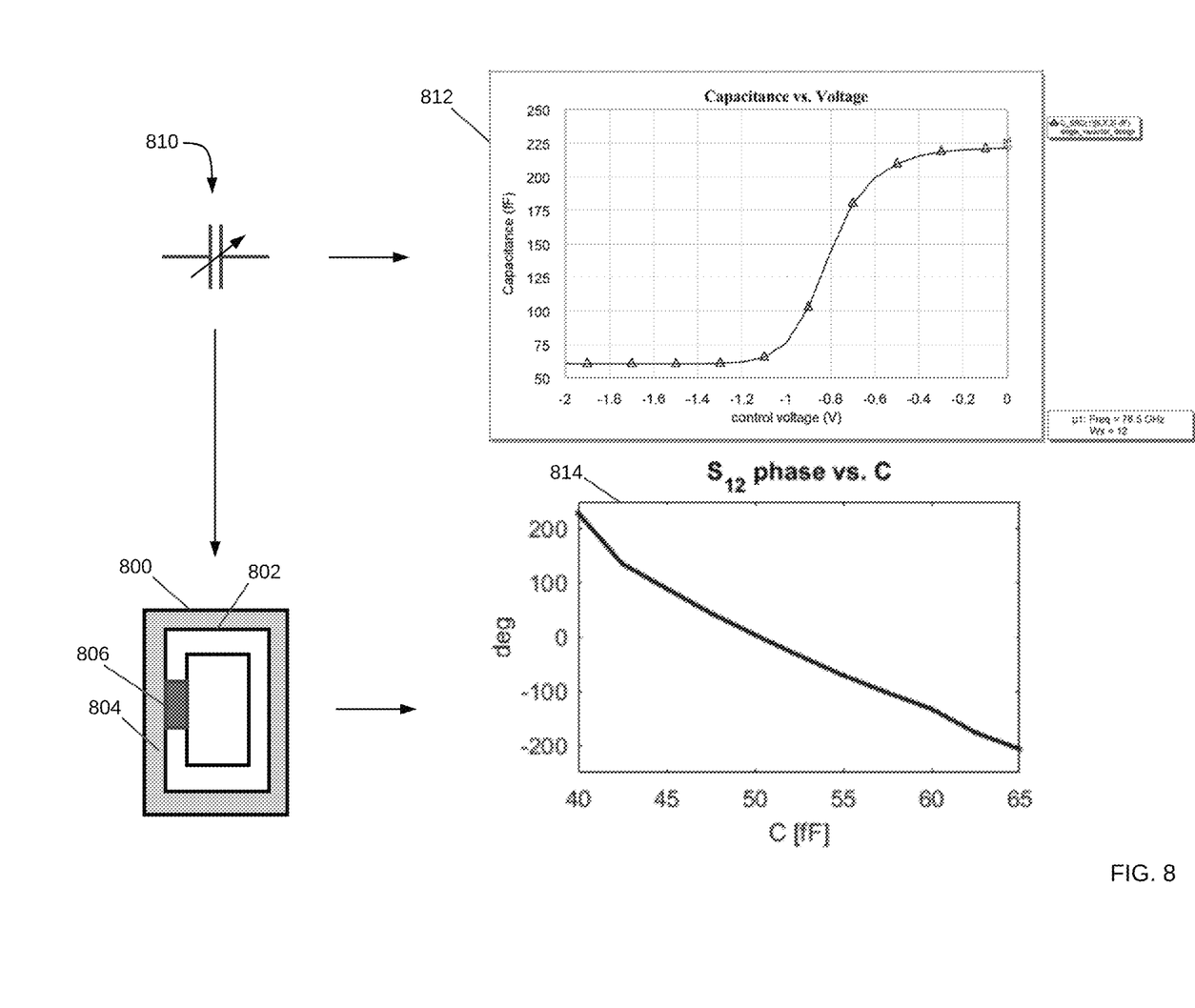
FIG. 8 is a schematic diagram of a resonant cell for use in an active sensing and communication system in accordance with various examples.

Referring now to FIG. 8, a schematic diagram of a resonant cell for use in an active sensing and communication system in accordance with various examples is described. Resonant cell 800 is a metamaterial cell having a conductive outer portion or loop 802 surrounding a conductive area 804 with a space in between. Resonant cell 800 may be configured on a dielectric layer and a glass substrate, with the conductive areas and loops provided around and between different cells. A voltage controlled variable reactance device 806, e.g., a varactor 810, provides a controlled reactance between the conductive area 804 and the conductive loop 802. The controlled reactance is controlled by an applied voltage, such as an applied reverse bias voltage in the case of a varactor. The change in reactance changes the behavior of the cell 800, enabling a reflect array of multiple cells 800 to provide beam steering.

Graph 812 illustrates how the varactor 810's capacitance changes with the applied voltage. The change in reactance of varactor changes the behavior of the cell 800, enabling a resonant array of cells 800 to provide focused, high gain beams directed to any desired location. Each beam may be directed to have a phase that varies with the reactance of the varactor, as shown in graph 814 illustrating the change in phase with the change in reactance of varactor 602. With the application of a control voltage to the varactor 810, the cell 800 is able to generate beams at any direction about a plane.

It is appreciated that the disclosed sensing and communication system examples are a dramatic improvement to wireless systems as they provide enhanced communications and coverage for wireless users within and in the vicinity of smart infrastructures. The disclosed examples can be fabricated in different configurations, act as passive or active relays and be easily attached to glass windows in smart infrastructure, vehicles and so on.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A smart infrastructure sensing and communication system, comprising:

a resonant structure formed of an array of resonant cells, the resonant structure attached to a glass of a smart infrastructure and to generate a radio frequency ("RF") signal that is shaped and steered by the array, the RF signal relayed through the glass to specific and predefined locations inside the smart infrastructure; and a controller in communication with the resonant structure to receive the RF signal.

2. The smart infrastructure sensing and communication system of claim 1, wherein a resonant cell in the array is a passive resonant cell comprising a single layer resonant patch in a glass substrate.

3. The smart infrastructure sensing and communication system of claim 1, wherein a resonant cell in the array is a passive resonant cell comprising a multi-layer resonant patch in a glass substrate.

4. The smart infrastructure sensing and communication system of claim 1, wherein a resonant cell in the array is an active metamaterial cell.

5. The smart infrastructure sensing and communication system of claim 4, wherein the active metamaterial cell comprises a varactor to provide a phase shift in the RF signal.

6. The smart infrastructure sensing and communication system of claim 1, wherein the resonant structure relays the RF signal from an RF signal received from outside the smart infrastructure to the controller.

7. The smart infrastructure sensing and communication system of claim 1, wherein the resonant structure relays the RF signal from an RF signal received from outside the smart infrastructure to another resonant structure within the smart infrastructure.

8. The smart infrastructure sensing and communication system of claim 1, wherein the resonant structure relays the RF signal from an RF signal received from outside the smart infrastructure to a wireless user within the smart infrastructure.

9. The smart infrastructure sensing and communication system of claim 1, wherein the smart infrastructure comprises one of: a smart building; a smart vehicle; a smart road sign; and a smart lamp post.

10. The smart infrastructure sensing and communication system of claim 1, wherein the resonant structure relays the RF signal from an RF signal received from outside the smart infrastructure to another resonant structure in another smart infrastructure.

11. The smart infrastructure sensing and communication system of claim 1, wherein the controller controls an aspect of the smart infrastructure based on the RF signal generated by the resonant structure.

12. A passive resonant cell for use in a smart infrastructure sensing and communication system of a smart infrastructure, the passive resonant cell attached to a glass in the smart infrastructure and comprising:
a plurality of glass layers;
a ground metal layer; and
a plurality of metal patches to generate a reflection of an RF signal received from outside of the smart infrastructure, the reflection of the RF signal relayed through the glass to specific and predefined locations inside the smart infrastructure.

13. The passive resonant cell of claim 12, wherein the plurality of glass layers comprises a bottom glass layer and a top glass layer to prevent oxidation of the plurality of metal patches.

14. The passive resonant cell of claim 12, wherein each metal patch in the plurality of metal patches is placed on top of a PVB layer and underneath a glass layer.

15. The passive resonant cell of claim 12, wherein the RF signal is reflected to a controller to control an aspect of the smart infrastructure.

16. The passive resonant cell of claim 12, wherein the RF signal is reflected to a wireless device within the smart infrastructure.

17. The passive resonant cell of claim 12, wherein the RF signal is reflected to a resonant structure outside the smart infrastructure.

18. An active resonant cell for use in a smart infrastructure sensing and communication system, the active resonant cell attached to a glass in the smart infrastructure and comprising:
a metamaterial cell having a conductive outer portion surrounding a conductive area, the metamaterial configured on a dielectric layer and a glass substrate and to relay an RF signal received from outside the smart infrastructure through the glass to specific and predefined locations inside the smart infrastructure; and
a voltage controlled reactance device placed between the conductive outer portion and the conductive area.

19. The active resonant cell of claim 18, wherein the voltage controlled reactance device is a varactor.

20. The active resonance cell of claim 19, wherein the varactor generates a phase shift in the relayed RF signal.

* * * * *